United States Patent
Cook

(10) Patent No.: US 6,731,735 B1
(45) Date of Patent: May 4, 2004

(54) URL-BASED DIALING FOR VOICE TELEPHONE CALLS

(75) Inventor: Fred S. Cook, Olathe, KS (US)

(73) Assignee: Sprint Communications Company, L.P., Overland Park, KS (US)

(*) Notice: Subject to any disclaimer, the term of this patent is extended or adjusted under 35 U.S.C. 154(b) by 106 days.

(21) Appl. No.: 10/185,441

(22) Filed: Jun. 28, 2002

(51) Int. Cl.[7] ................................................ H04M 3/42
(52) U.S. Cl. .............................. 379/207.11; 379/88.17; 379/221.09
(58) Field of Search ........................ 379/201.01, 207.02, 379/207.11, 88.17, 221.09, 221.11

(56) References Cited

U.S. PATENT DOCUMENTS

| | | | | |
|---|---|---|---|---|
| 6,014,379 A | * | 1/2000 | White et al. | 370/389 |
| 6,021,126 A | * | 2/2000 | White et al. | 370/352 |
| 6,026,441 A | * | 2/2000 | Ronen | 709/227 |
| 6,069,890 A | * | 5/2000 | White et al. | 370/352 |
| 6,131,095 A |   | 10/2000 | Low et al. | 707/10 |
| 6,215,790 B1 | * | 4/2001 | Voit et al. | 370/401 |
| 6,243,374 B1 | * | 6/2001 | White et al. | 370/352 |
| 6,252,952 B1 | * | 6/2001 | Kung et al. | 379/111 |
| 6,442,549 B1 | * | 8/2002 | Schneider | 707/10 |

FOREIGN PATENT DOCUMENTS

WO    WO 01/78336 A1    10/2001    .......... H04L/12/66

* cited by examiner

Primary Examiner—Creighton Smith

(57) ABSTRACT

A uniform resource locator (URL) used for Internet access is employed as a name for dialing a plain old telephone service (POTS) voice call to a party associated with a specific Internet site. Due to the worldwide nature of the Internet, the large size of many of the companies with Internet sites, the temporary unavailability of specific sites, and for other reasons, it can be extremely difficult to place a telephone call to the appropriate individual, department, or other representatives with knowledge about a specific Internet site. The present invention provides an automated "name translation" from a URL to a target telephone number in response to requests initiated within the telephone system by a calling party. The entity owning the website achieves improved availability to the public via voice telephone calls because the URL names are convenient, familiar, and meaningful to customers. The invention expands the role of domain name system (DNS) servers by making them a tie-point for a voice calling service.

15 Claims, 4 Drawing Sheets

URL-BASED DIALING FOR VOICE TELEPHONE CALLS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to establishing a voice telephone call with an entity having a presence on the Internet when a calling party does not know the telephone number of the called party.

In establishing a POTS (plain old telephone service) voice call between a calling party and a called party, the calling party must dial a telephone number that identifies the telephone of the called party. Sometimes, this identification may be through an intermediate number which is translated into an actual destination telephone number, such as in a toll-free (i.e., "800" number) service. Nevertheless, the number dialed uniquely identifies the called party.

Even when telephone numbers have been known or used in the past by the calling party, they can be easily misplaced and are easily forgotten because they are usually just a string of arbitrary numbers. In the event that the calling party does not know an appropriate telephone number for the called party, they may search for a telephone number using telephone company directory assistance, published telephone books, on-line search engines, and other sources. Typically in such a search, at least a personal or business name of the called party must be known. If the name is not accurately specified, then the number search can be difficult and time consuming. Even with the correct name, searching can still be inconvenient and/or time-consuming. For a called party that is a commercial enterprise desiring to be called by potential customers, any significant difficulty in identifying the appropriate telephone number can result in lost business, for example.

Many businesses and other entities seek to interact with the public (e.g., consumers) via the Internet. The Internet comprises a plurality of interconnected computer networks. Each communication packet sent over the Internet includes fields that specify the source and destination address of the packet according to Internet Protocol (IP) addresses assigned to the network interface nodes involved. Currently, assigned addresses comprise 32 bits, although future standards allow for 128-bit addresses. The 32-bit addresses are normally written by breaking the 32 bits into 4 groups of 8 bits each and writing the decimal equivalents of each group separated by periods (e.g., 208.25.106.10).

Since numerical IP addresses are inconvenient to use and remember, a protocol for assigning and accessing logical names is used known as the domain name system (DNS). DNS servers are deployed within the Internet which perform a translation function between a logical domain name (also known as a uniform resource locator, or URL) such as "sprint.com" and its numerical equivalent "208.25.106.10". After receiving an IP address back from a DNS server, a computer can forward data packets to the IP address and establish a connection or session with the remote computer. A URL or other logical name being used by an entity may become one of the most familiar labels that the public associates with the entity since they can be chosen to be both descriptive and easy to remember.

A user views web-pages of a desired Website within a browser application that navigates to web-pages in response to URL's input by the user within the browser. In the event that a Website user may wish to have a telephonic voice call with a contact representative of the business or entity, appropriate telephone numbers are oftentimes (but not always) displayed on the web-pages themselves (or means may be provided to actually complete a voice connection over the Internet itself, known as voice over IP or VOIP). However, users may still not be able to identify a desired telephone number or create an Internet-based voice connection because 1) no telephone number or VOIP link is given, 2) a Website may be temporarily unavailable due to equipment failure, and 3) there may be many potential customers that do not have access or do not desire to use the Internet.

SUMMARY OF THE INVENTION

The present invention has the advantage of allowing a POTS voice telephone call to be placed to an entity having a presence on the Internet when a calling party does not know the telephone number of the called entity and without the need of the calling party to have any access to the Internet itself. All that is needed is the URL used by the entity in connection with a web-page. Web-pages would no longer need to explicitly list a telephone number. Furthermore, the URL may even be known to those who are not Internet users because of advertising or other publicity.

In one aspect of the invention, a method is provided for establishing a POTS call between a calling party and a called party wherein the called party is identified by uniform resource locator (URL) information. A first POTS call is established from the calling party to a DNS lookup service using a predetermined access number. The URL information is transferred from the calling party to the DNS lookup service via the first POTS call. A target telephone number of the called party is retrieved from a DNS database of the DNS lookup service in response to the URL information. A second POTS call is established between the calling party and the called party in response to the target telephone number.

DETAILED DESCRIPTION OF PREFERRED EMBODIMENTS

Figure 1:
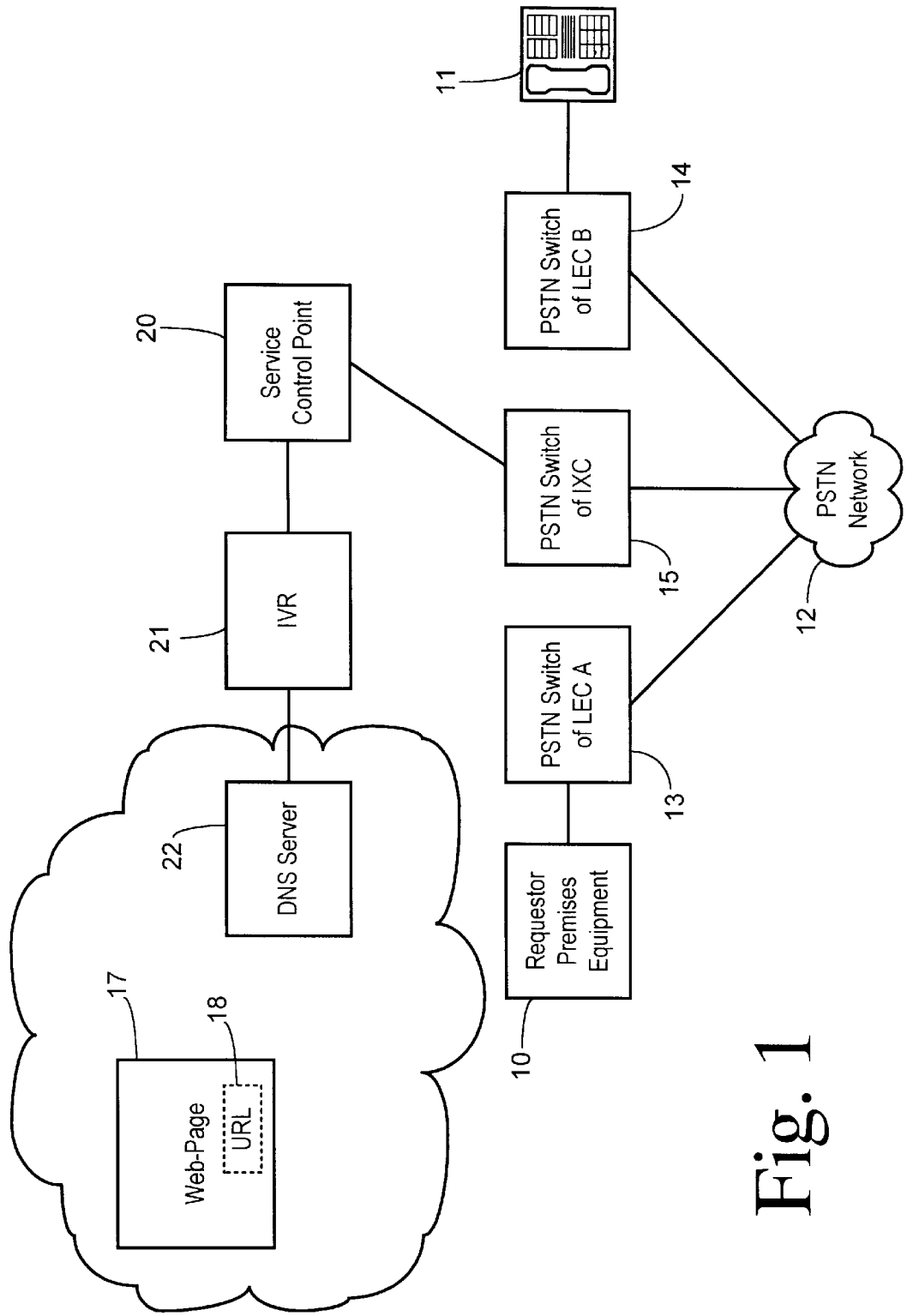
FIG. 1 is a block diagram of a telecommunications system for completing POTS calls according to the present invention.

Referring to FIG. 1, the objective of the present invention is to establish a voice telephone call between a calling party having requestor premises equipment 10 and a called party having premises equipment 11. Equipment 10 and 11 may be comprised of standard telephone units with touch-tone (DTMF) dialing, for example. Requestor premises equipment 10, in particular, may further be comprised of a computer modem for more sophisticated data exchange and for automated dialing as described later. Equipment 10 and 11 are to be interconnected via a public switched telephone network (PSTN) 12 in a plain old telephone service (POTS) voice call based on the calling party's knowledge of 1) a telephone number for a URL-based dialing service, and 2) a URL of the called party.

The requestor initiates a call to the URL-based dialing service by connecting with a PSTN switch 13 of their local exchange carrier (LEC A) and dialing a predetermined access number for the service. The DNS service can be either a public or a private service. The access number may be comprised of a normal direct dialed telephone connection or may be a special service access code (SAC) telephone number such as non-geographic toll-free "800" or fee-type "900" numbers that are translated to a geographic telephone number by equipment within the PSTN. In this example, the final destination (i.e., telephone 11) is reached via a PSTN switch 14 of a local exchange carrier LEC B. A call between LEC A and LEC B may be completed through an interexchange carrier (IXC) which operates a PSTN switch 15, which in this example is also connected to the DNS lookup service of the present invention. The DNS lookup service could alternatively be accessible through an LEC.

Internet 16 includes a web-page 17 associated with an entity (e.g., an individual, organization, or business enterprise) that is available for receiving telephone calls via telephone unit 11. Web-page 17 is reachable within Internet 16 according to a URL 18 whereby an assigned domain name is resolved to the corresponding IP address using any of the plurality of DNS servers deployed within Internet 16.

IXC switch 15 has an associated service control point (SCP) 20 connected to an intelligent voice response (IVR) device 21 which acts as an interface between requestor equipment 10 and a DNS server 22. In the embodiment shown, server 22 is connected within Internet 16 so that a DNS database can be maintained and updated within DNS server 22 in a conventional manner. DNS server 22 could alternatively be separate from (i.e., not connected to) the Internet, in which case a DNS database residing in server 22 would have to be separately updated.

SCP 20 provides switching logic for switch 15 as part of an advanced intelligent network (AIN) architecture. Additional SCP's (not shown) are typically also connected to LEC switches 13 and 14 in a conventional manner.

IVR 21 performs the functions of receiving URL information from a requester, querying the DNS server for a target telephone number corresponding to the URL information, and initiating steps to establish the desired POTS call from the requestor to the web-page owner or operator. As used herein, IVR device refers to any computerized equipment adapted for interfacing between a telephone system and a computer network. Various technologies can be employed for the acquisition of the URL itself. IVR 21 may include a voice recognizer so that a calling party can speak (or spell) the URL. Alternatively, the calling party may input information using touch-tone (i.e., DTMF) signals in order to spell out the URL in conjunction with an interactive menu created using voice synthesis by IVR 21. Where requestor premises equipment 10 includes a personal computer and a modem, the URL information can be transmitted to IVR 21 using dial-up networking, for example.

IVR 21 preferably employs a TCP/IP interface with DNS server 22 and formats DNS lookup requests to include 1) a URL associated with a target telephone number, and 2) identification of the service type of "POTS voice service." After DNS server 22 responds with the target telephone number at which a representative of the URL can be reached, IVR 21 reports data representing the target telephone number so that the desired POTS voice call can be established. So that no further action is required at the requestor premises equipment end, the IVR side of the existing call between equipment 10 and IVR 21 can be transferred by SCP 20 to LEC B and to equipment 11. Alternatively, the target telephone number (i.e., dial string) can be reported directly to requestor premises equipment 10 so that a separate POTS call can be originated. For example, IVR 21 may generate the target telephone in synthesized speech transmitted to the calling party over the existing POTS call. Alternatively, if a dial-up networking modem connection is established then the target telephone number can be transmitted digitally and the modem in equipment 10 can automatically dial the target telephone number. In addition, if equipment 10 has adequate intelligence it can cache the target telephone number in association with the original URL so that subsequent calls can be made without the need to contact the DNS lookup service.

Figure 2:
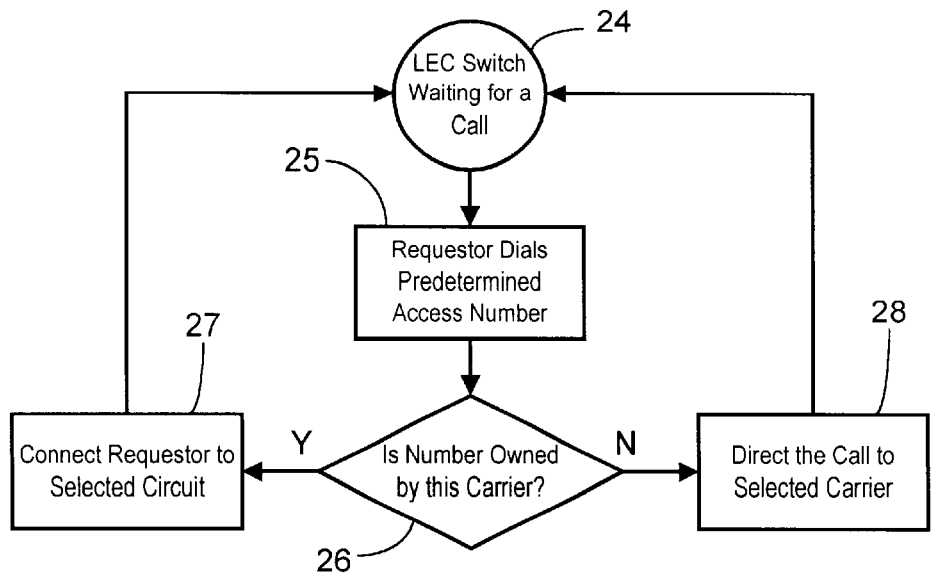
FIG. 2 is a flowchart showing normal operation of a local exchange carrier in the present invention.

FIG. 2 shows operations of the LEC A switch. In step 24, the LEC A switch is waiting for a call. In step 25, the calling party wishes to initiate a POTS voice call with a representative of the entity associated with a web-page having a known URL, and so they dial a predetermined access number for the URL-based DNS telephone lookup service. The LEC switch and any associated SCP determine, in step 26, whether the predetermined access number is owned by the LEC. If it is, then the requester (i.e., calling party) is connected to a selected circuit corresponding to the access number in step 27. If the access number is not owned by the LEC, then the call is directed to a selected carrier (e.g., an IXC or LEC corresponding to the access number) in step 28.

Figure 3:
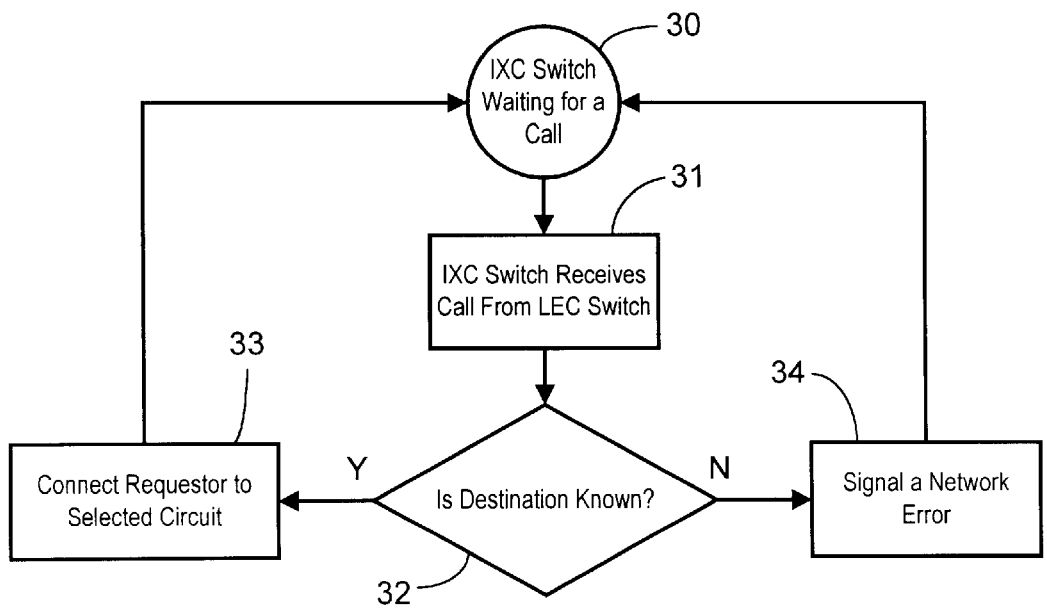
FIG. 3 is a flowchart showing normal operation of an interexchange carrier switch.

FIG. 3 shows operation of an IXC switch when the DNS lookup service is operated by the IXC. In step 30, the IXC switch is waiting for arrival of a new call. In step 31, a call is received that was directed to the IXC switch by an LEC switch. A check is made in step 32 to determine whether the destination of the call is known in this IXC. If so, then the incoming call (i.e., the requestor or calling party) is connected to the selected circuit leading to the DNS lookup service in step 33. Otherwise, a network error is signaled in step 34.

Figure 4:
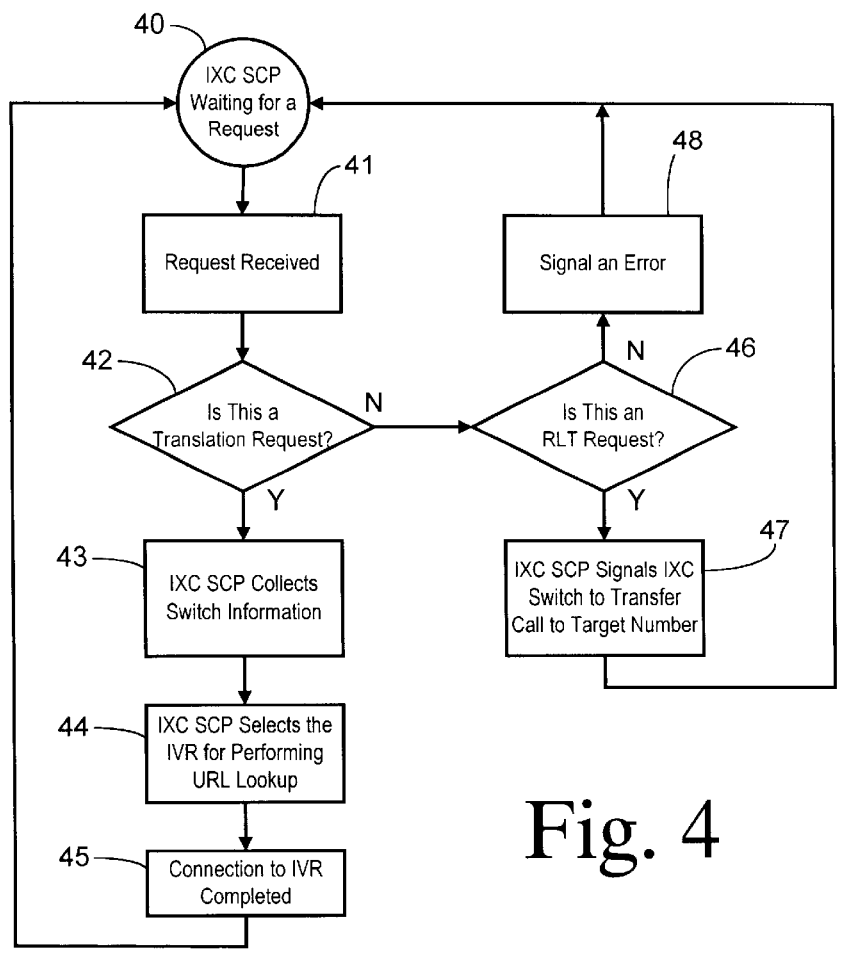
FIG. 4 is a flowchart showing operation of an interexchange carrier service control point (SCP) according to one preferred embodiment.

FIG. 4 shows operation of a service control point associated with a switch where the DNS lookup service resides. In step 40, the SCP is waiting for a servicing request. In step 41, a request is received. In one preferred embodiment, a request may relate either to an incoming call from a requestor to be translated to (i.e., interconnected with) the DNS lookup service or to an already pending call that is to be transferred from the DNS lookup service to a final destination or target telephone number of the called party. Thus, in step 42, a check is made to determine whether the received request is one for a translation to the lookup service (i.e., a remapping of the predetermined access number to the real telephone number of the IVR). If yes, then switch information (e.g., the access number that was dialed) is collected in step 43. In step 44, the SCP finds an IVR for performing the desired URL lookup. The connection to the IVR is completed in step 45 by the SCP configuring the corresponding switch. Steps 43–44 would not be necessary if the predetermined access number used by the calling party is the same as the real telephone number of the IVR.

If the request to the SCP was not a translation request in step 42, then a check is made in step 46 to determine whether it is a request to transfer a pending call out to a final destination. Such a transfer may be accomplished using release link trunking (RLT) as is available in many commercial SCP devices. If yes, then the SCP signals the corresponding switch to transfer the call to the target telephone number contained in the RLT request in step 47. Otherwise, an error is signaled in step 48. Steps 46 and 47 would not be used in an embodiment wherein the IVR reports the target number back to the requestor via the pending call so that the requestor can direct dial the target number.

Figure 5:
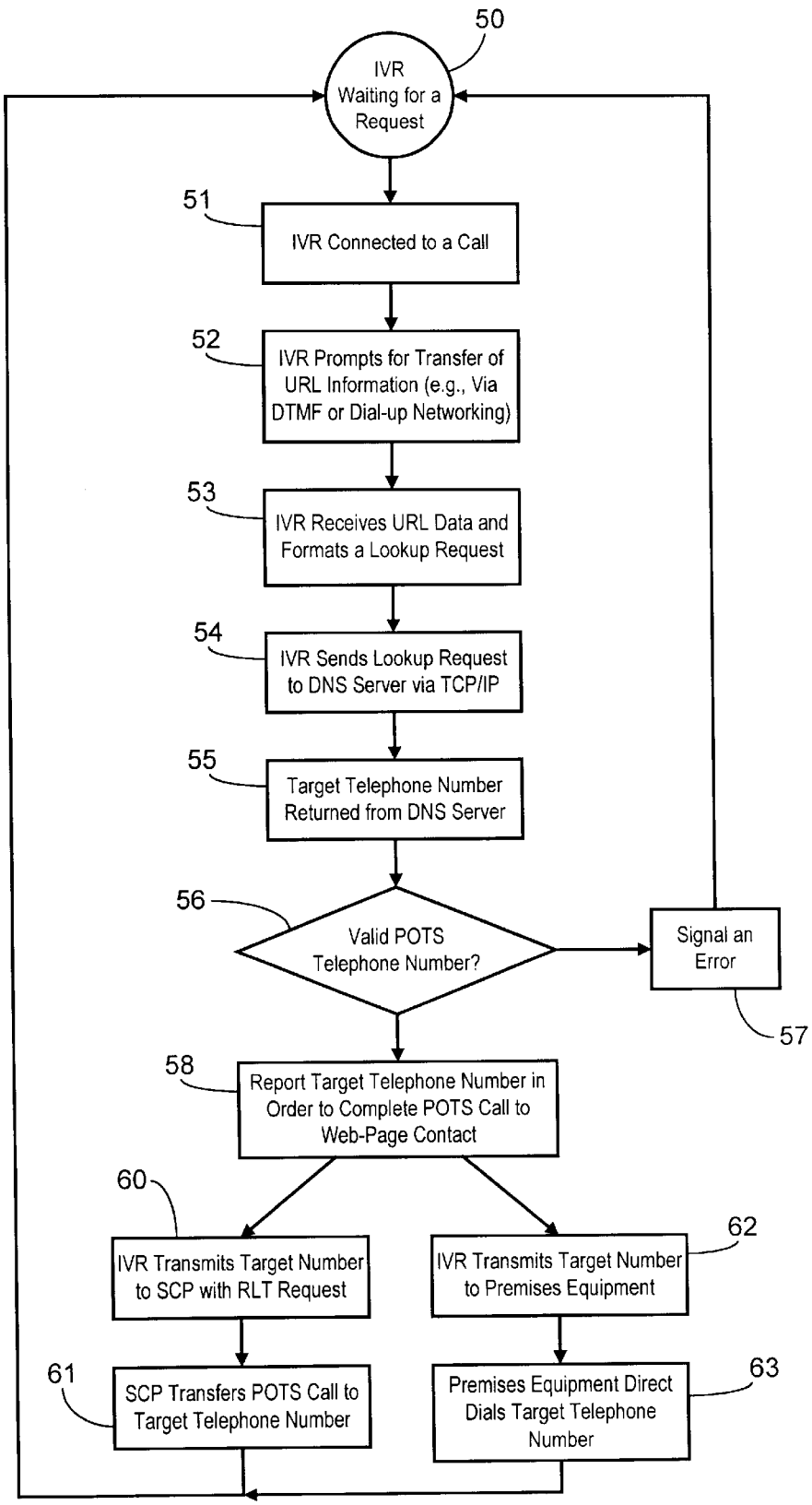
FIG. 5 is a flowchart showing operation of an intelligent voice response (IVR) unit in the present invention.

FIG. 5 shows operation of the interactive voice response unit, which is essentially a computer device for bridging between the PSTN system and the DNS server. In step 50, the IVR is waiting for a request. The IVR is connected to an incoming call in step 51. Once a call is answered, the IVR prompts the requestor for a transfer of the URL information in step 52. The prompts may be comprised of 1) synthesized or recorded voice prompts to guide a calling party through the process of entering URL information using DTMF tones or spoken commands, 2) handshaking signals for a modem session for dialup networking when the requestor equipment includes a computer device, or 3) any other desired method for signaling or data transfer via the POTS voice channel for which the requester has any necessary hardware.

The IVR receives the URL information that the calling party has identified (e.g., a domain name such as "www.Sprint.com") and formats a DNS lookup request message in step 53. In step 54, the IVR transmits the DNS request to the DNS server via a TCP/IP connection therebetween. The computer network connection to the DNS server can be within a private network or can be a connection to a DNS server residing on the Internet, for example, provided that the DNS server contains a DNS database compiled with URL data correlating respective web-pages (i.e., domain names) with respective telephone numbers for respective web-page contact persons. The DNS server may also contain respective IP addresses so that it is used for dual purposes of DNS lookup for Internet traffic and for telephone contacts. The entities owning the various domain names can provide the telephone contact numbers to be associated with their URL's in the domain name system.

In step 55, the DNS server returns the target telephone number to the IVR. A check is made to determine whether a valid POTS telephone number was returned in step 56. If not, then an error is signaled in step 57. Otherwise, the IVR reports the target telephone number in step 58 so that a POTS call can be completed to the respective web-page contact.

FIG. 5 shows two alternative embodiments for completing the POTS call to the final destination. In the first embodiment wherein the pending call is transferred, the IVR transmits the target telephone number to the SCP along with an RLT request in step 60. The SCP then transfers the pending call to the target phone number in step 61. In the second embodiment wherein the requestor initiates a new, direct-dialed call, the IVR transmits the target telephone number to the requestor premises equipment in step 62. This transmission may comprise a synthesized voice report or a digital modem signal, for example. Having acquired the target telephone number, the requestor premises equipment direct dials the target number in step 63 (e.g., manually dialed by hand or automatically dialed by modem).

Figure 6:
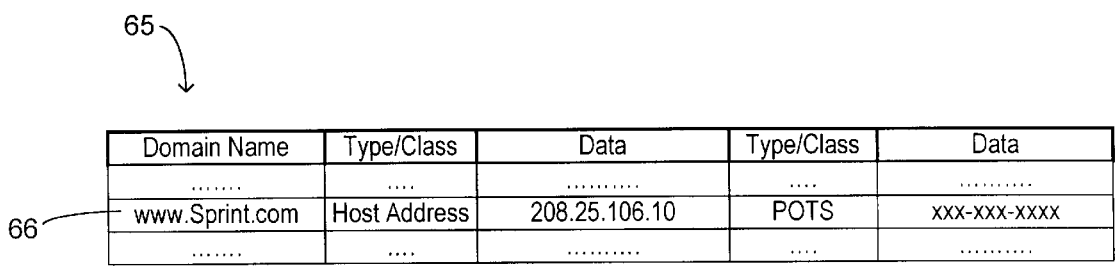
FIG. 6 shows an example record in a DNS database including POTS telephone number data.

FIG. 6 shows a portion of a DNS database for practicing the present invention. A group of DNS records are stored in a standardized format, with each record providing an associated domain name or URL together with various data types and their respective data fields. For example, a DNS record 66 for the URL "www.Sprint.com" provides for lookup of a respective IP address as identified by the "Host Address" data type. In addition, POTS telephone data is provided as identified by the "POTS" data type.

What is claimed is:

1. A method of establishing a POTS call between a calling party and a called party wherein said called party is identified by uniform resource locator (URL) information, comprising the steps of:

establishing a first POTS call from said calling party to a DNS lookup service using a predetermined access number;

transferring said URL information from said calling party to said DNS lookup service via said first POTS call;

retrieving a target telephone number of said called party from a DNS database of said DNS lookup service in response to said URL information; and establishing a second POTS call between said calling party and said called party in response to said target telephone number.

2. The method of claim 1 wherein said second POTS call is established by said first POTS call being transferred from said predetermined access number to said target telephone number.

3. The method of claim 1 further comprising the step of transmitting data representing said target telephone number from said DNS lookup service to said calling party, wherein said second POTS call is directly dialed by said calling party in response to said target telephone number.

4. The method of claim 3 wherein said transmitted data is received by a modem and wherein said modem performs said direct dialing.

5. The method of claim 1 wherein said DNS lookup service comprises an interactive voice response (IVR) device coupled to a DNS server, wherein said IVR device receives said URL information from said calling party, and wherein said method further comprises the steps of:

said IVR device formatting a lookup request in response to said URL information;

said IVR device transmitting said lookup request to said DNS server via a TCP/IP interface; and said DNS server returning said target telephone number via said TCP/IP interface.

6. The method of claim 5 wherein said lookup request identifies a service type corresponding to POTS voice service.

7. The method of claim 5 wherein said DNS lookup service further includes a service control point (SCP), said method further comprising the steps of:

said IVR device transmitting said target telephone number to said SCP; and said SCP transferring said first POTS call to said target telephone number of said called party to establish said second POTS call.

8. The method of claim 7 wherein said transfer is comprised of release link trunking.

9. The method of claim 5 further comprising the steps of:

said IVR device transmitting data representing said target telephone number to said calling party; and said calling party directly dialing said calling party in response to said target telephone number.

10. A method of operating a DNS lookup service for providing POTS telephone number information corresponding to uniform resource locator (URL) data so that a POTS call can be established between a requestor and a web-page contact, said method comprising the steps of:

compiling a domain name system (DNS) database correlating said URL data of respective web-pages with a respective IP address and a respective telephone number for a respective web-page contact;

receiving a first POTS call from said requestor made to a predetermined access number;

receiving said URL data from said requestor;

retrieving a target telephone number of a respective web-page contact from said DNS database in response to said URL data; and reporting said target telephone number in order to complete said POTS call from said requestor to said web-page contact.

11. The method of claim 10 wherein said target telephone number is reported to a service control point (SCP) controlling a POTS switch corresponding to said predetermined access number, and wherein said SCP transfers said first POTS call to said target telephone number.

12. The method of claim 10 wherein said target telephone number is reported to premises equipment of said requestor, and wherein said premises equipment dials said target telephone number.

13. The method of claim 10 wherein said DNS lookup service comprises an interactive voice response (IVR) device coupled to a DNS server, wherein said IVR device receives said URL data from said requestor, and wherein said method further comprises the steps of:

said IVR device formatting a lookup request in response to said URL data;

said IVR device transmitting said lookup request to said DNS server via a TCP/IP interface; and said DNS server returning said target telephone number via said TCP/IP interface.

14. The method of claim 13 wherein said lookup request identifies a service type corresponding to POTS voice service.

15. A software product for a DNS lookup service to provide POTS telephone number information corresponding to uniform resource locator (URL) data so that a POTS call can be established between a requester and a web-page contact, said software product comprising:

software configured to access a domain name system (DNS) database correlating said URL data of respective web-pages with a respective IP address and a respective telephone number for a respective web-page contact;

software configured to receive said URL data from said requestor;

software configured to retrieve a target telephone number of a respective web-page contact from said DNS database in response to said URL data; and software configured to report said target telephone number in order to complete said POTS call from said requestor to said web-page contact.

* * * * *